July 6, 1948.　　　P. L. BUSH　　　2,444,727
UNITARY CLAMP FOR FRICTIONALLY
HELD MULTIPLE SURFACES
Filed Aug. 21, 1945
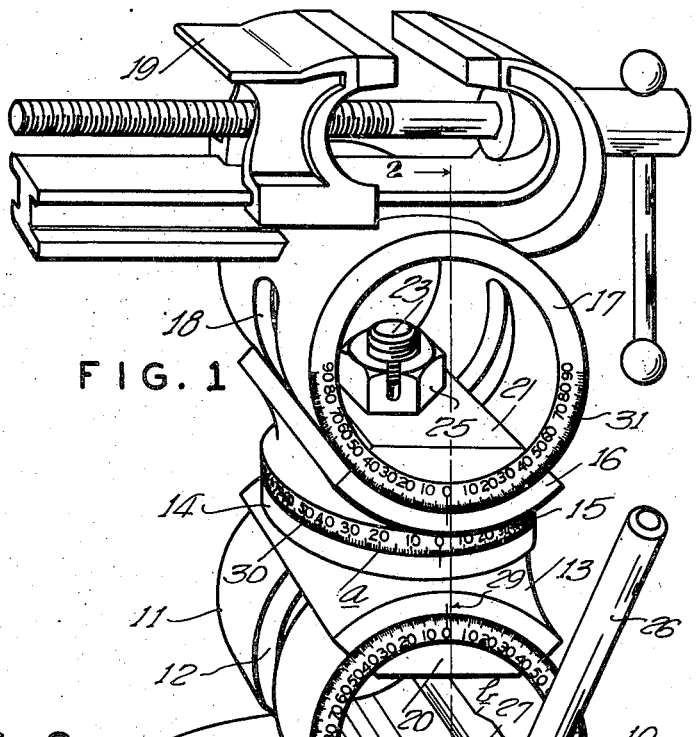
FIG. 1
FIG. 2　　　FIG. 3
PAINE L. BUSH
INVENTOR.
BY
ATTORNEY
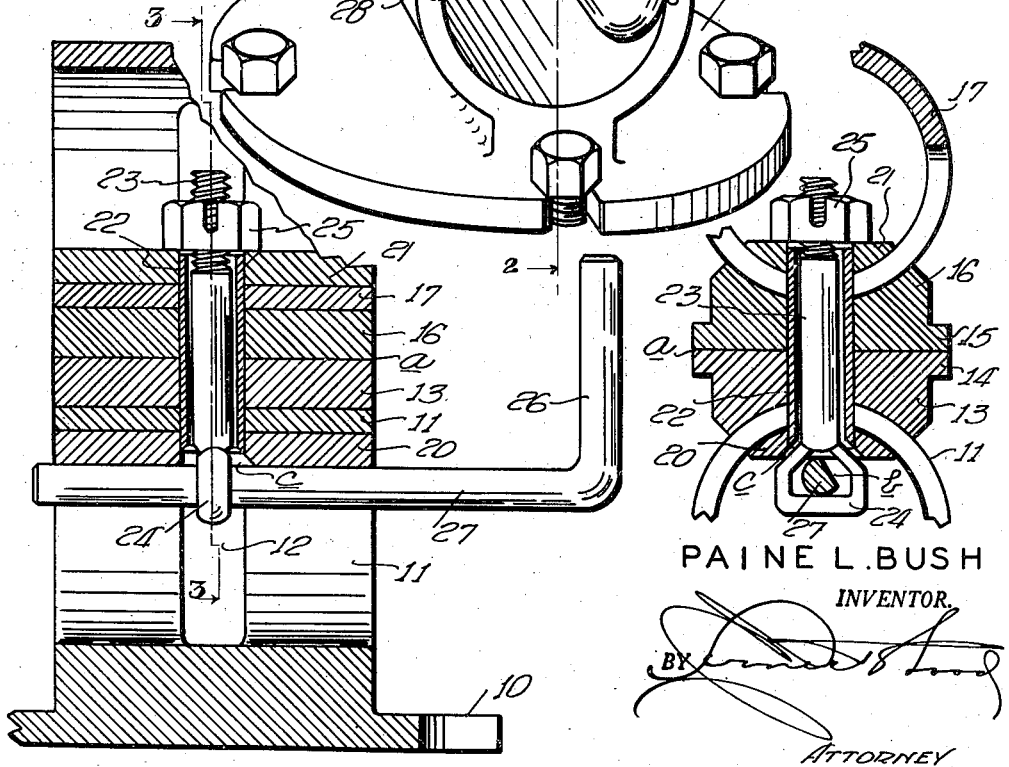

Patented July 6, 1948

2,444,727

UNITED STATES PATENT OFFICE 2,444,727

UNITARY CLAMP FOR FRICTIONALLY HELD MULTIPLE SURFACES

Paine L. Bush, Dallas, Tex.

Application August 21, 1945, Serial No. 611,831

1 Claim. (Cl. 81—41)

This invention relates to work holding apparatus and more particularly to adjustable vises.

The principal object of the invention is to provide a support for a vise, clamp or other work holding medium, adapted to be affixed to a table or bench and which consists of superimposed, cylindrical elements, the upper of which constitutes or carries the work holding means and is capable of rotative and oscillative displacement with respect to the lower and supporting cylindrical element, in different positions thereon throughout a range of 180° about a horizontal axis and 360° on an axis perpendicular to said horizontal axis. In being thus able to orient the work supporting means, accessibility to the work in almost any desirable position is made possible without removing the same from the work holding means.

Another object of the invention is to provide a work holder of the character set forth in which all movable elements thereof may be made rigid simultaneously by the simple manipulation of a single lever.

With the foregoing objects as paramount, the invention has further reference to certain features of accomplishment which will become apparent as the description proceeds, taken in connection with the accompanying drawings wherein:

Figure 1 is a perspective view of a work clamp mounting constructed according to the present invention.

Figure 2 is a vertical sectional view as taken on the line 2—2 of Figure 1, and

Figure 3 is a detail view of the rotative axis as taken on the line 3—3 in Figure 2.

Continuing with a more detailed description of the drawing, reference is primarily made to Figure 1 wherein numeral 10 denotes a base of any suitable or desirable form, on which is affixed diametrically, a cylindrical body 11 of durable steel. This body constitutes the lower section of the mounting and is stationary with the base 10. An annular slot 12 is made in the body 11 midway of its ends and terminates at the base on each side of the body.

Mounted on the body 11 is a saddle 13, having an integral boss 14 thereon, on which rests an identical boss 15, integral with an arcuate support 16 for the upper section or cylindrical body 17 of the mounting. This body 17 is also slotted annularly at 18, the ends of the slots terminating short of a vise or other work clamping member 19, superimposed on said body 17.

The two bosses 14 and 15 have flat engaging surfaces at $a$ in order that relative rotation of the upper and lower mounting sections may be effected. It will also be observed that in opposition to each of the members 13 and 16 which bear against the outer surfaces of the cylindrical bodies 11 and 17, are friction plates 20 and 21 respectively.

The friction plates 20 and 21, as well as the bosses 14 and 15 and the arcuate plates 13 and 16 on which the bosses are formed, are all apertured midway between their ends to receive a sleeve 22 which extends through the members but terminates short of the outer faces of the friction plates 20 and 21, as apparent in Figures 2 and 3. This is effected to insure adequate frictional engagement between all of the named parts, brought about in a manner to be presently explained.

Extending axially through the sleeve 22 is a bolt 23, on the lower end of which is a loop 24. The bolt and loop are of hardened steel, as is likewise the sleeve 22 through which the bolt passes. The bolt is threaded on its upper end to receive a nut 25. A clamping lever 26 is provided with a rod 27, which extends into the lower of the two cylindrical bodies and through the loop 24 on the bolt 23. That portion of the rod 27, lying in the loop 24 is flattened at $b$ to define a form of cam. In Figure 3 it is apparent that the loop 24 through which the rod 27 extends is formed with a flat lower portion and has angular arms which extend upwardly into a coniform recess $c$ in the undersurface of the friction plate 20. Therefore, the rod 27, in one position, will bear against the undersurface of the said friction plate 20, while in another position, it will be spaced therefrom or out of frictional engagement with the said plate 20.

In operation, the lever 26 is moved to dispose the rod 27 in such position that the flattened portion $b$ thereof will confront the undersurface of friction plate 20. This action will release all of the parts for independent manipulation preparatory to relocating them in a new position. A graduated scale 28 is provided on an end of the lower cylindrical body 11, to which a mark 29 on the saddle 13 corresponds, as a guide to the operator in determining degrees of displacement of the saddle 13 in adjusting the mounting. A similar scale 30 is afforded on the boss 15, with a corresponding mark on the companion boss for determining degrees of rotation about a vertical axis, while the graduations 31 on the upper cylindrical member 17 provides a medium for calculating degrees of displacement of the clamping member 19 on a horizontal axis.

After having secured the work in the vise or clamp 19 and oriented the upper and lower sections of the mounting to locate the work in the desired position, the lever 26 is actuated to urge the cam face of rod 27 against the undersurface of the friction plate 20, with the lower portion of loop 24 affording a backing for the rod. This action imposes tension on the bolt 23 which in turn exerts great force in bringing the parts into frictional contact with each other. Accordingly, the two bosses are held in firm engagement at their meeting points at $a$ to prevent rotative displacement on a vertical axis, while the friction plates 20 and 21, combined with frictional engagement between the saddle members 11 and 17, prevent rotation or oscillation of the cylindrical bodies on their individual axes irrespective of the position at which they are disposed in locating the work.

It is obvious from the foregoing that the vise 19 may be rotated 360° on a vertical axis with the boss 15 as the bearing and further, it may be rotated 90° on a horizontal axis with the arcuate support 16 as the bearing. Beyond this, a longer radius of displacement on a horizontal axis may be effected through the medium of the saddle 13, on the lower cylindrical body 11. In fact, practically all positions in a semispherical range may be effected with the combination and relationship of parts shown and described, making access to the work easier with but little time consumed in the adjustments.

Manifestly, the construction as shown and described is capable of some modification and such modification as may be construed to fall within the scope and meaning of the appended claim is also considered to be within the spirit and intent of the invention.

What is claimed is:

In a vise mounting, a hollow, stationary, cylindrical body, a saddle thereon having a circular boss, a second hollow cylindrical body supporting said vice, having thereunder an inverted saddle and a circular boss frictionally bearing on said first boss, friction plates arranged conformably within said bodies opposing said saddles, means holding said bodies together whereby the upper thereof will be capable of limited rotation about the cylindrical axis of said first body and unlimited rotation on an axis perpendicular to said cylindrical axis, a bolt extending through elongated, transverse slots in said cylindrical bodies and through central apertures in said bosses and friction plates, said bolt having a loop on its lower end and a cam rod extending through said loop and oscillatable to exert a force axially on said bolt to impose tension on said holding means to bind said bosses, saddles and bodies against relative movement, said cylindrical bodies having graduations on their ends to indicate the degree of rotative displacement and oscillative movement of said second cylindrical body.

PAINE L. BUSH.

REFERENCES CITED

The following references are of record in the file of this patent:

UNITED STATES PATENTS

| Number | Name | Date |
| --- | --- | --- |
| 86,173 | Maynard | Jan. 26, 1869 |
| 776,553 | Scoggins | Dec. 6, 1904 |
| 851,491 | Broadbooks | Apr. 23, 1907 |
| 947,573 | Eager | Jan. 25, 1910 |
| 1,394,912 | Korkosz | Oct. 25, 1921 |
| 1,423,774 | Moore | July 25, 1922 |
| 1,441,413 | Gampe | Jan. 9, 1923 |

FOREIGN PATENTS

| Number | Country | Date |
| --- | --- | --- |
| 155,084 | Great Britain | Dec. 16, 1920 |